United States Patent
Gupta et al.

(10) Patent No.: US 8,332,622 B2
(45) Date of Patent: *Dec. 11, 2012

(54) BRANCHING TO TARGET ADDRESS BY ADDING VALUE SELECTED FROM PROGRAMMABLE OFFSET TABLE TO BASE ADDRESS SPECIFIED IN BRANCH INSTRUCTION

(75) Inventors: Anurag P Gupta, Saratoga, CA (US); John Keen, Mountain View, CA (US); Jeffrey G Libby, Cupertino, CA (US); Jean-Marc Frailong, Los Altos, CA (US); Avanindra Godbole, San Jose, CA (US); Sharada Yeluri, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/323,358

(22) Filed: Dec. 12, 2011

(65) Prior Publication Data
US 2012/0084534 A1  Apr. 5, 2012

Related U.S. Application Data

(63) Continuation of application No. 12/342,851, filed on Dec. 23, 2008, now Pat. No. 8,078,849.

(51) Int. Cl.
G06F 9/32 (2006.01)
(52) U.S. Cl. .................. 712/236; 711/220; 712/234
(58) Field of Classification Search .................. None
See application file for complete search history.

(56) References Cited

U.S. PATENT DOCUMENTS

| | | |
|---|---|---|
| 5,659,722 A | 8/1997 | Blaner et al. |
| 6,112,300 A | 8/2000 | Cook et al. |
| 6,851,046 B1 | 2/2005 | Delvaus et al. |
| 2006/0218385 A1* | 9/2006 | Smith et al. .................. 712/238 |
| 2007/0234019 A1 | 10/2007 | Terashima |
| 2008/0313443 A1 | 12/2008 | Terashima |
| 2009/0249047 A1 | 10/2009 | Citron |
| 2010/0161949 A1 | 6/2010 | Gupta et al. |

OTHER PUBLICATIONS

Papachristou, "Hardware Microcontrol Schemes Using PLAs", 14th Annual Microprogramming Workshop IEEE New York, NY, USA 1981, 14 pages, XP002530422.
Hirschman et al., "Microprogram Control System", IP.COM Journal, IP.COM Inc., West Henrietta, NY, USA, Mar. 1, 1980, 6 pages, XP013044292, ISSN:1533-0001.
Papachristou, "Method for Direct Multiway Branching in Microprogram Control", Electronics Letters US, vol. 17, No. 19, Sep. 17, 1981, 2 pages. ISSN: 0013-5194.
Shepherd, Juniper Networks, Inc., "White Paper: Characteristics of Switches and Routers", Jan. 2006, 22 pages.

* cited by examiner

*Primary Examiner* — Kenneth Kim
(74) *Attorney, Agent, or Firm* — Harrity & Harrity, LLP

(57) ABSTRACT

Methods and systems consistent with the present invention provide a programmable table which allows software to define a plurality of branching functions, each of which maps a vector of condition codes to a branch offset. This technique allows for a flexible multi-way branching functionality, using a conditional branch outcome table that can be specified by a programmer. Any instruction can specify the evaluation of arbitrary conditional expressions to compute the values for the condition codes, and can choose a particular branching function. When the processor executes the instruction, the processor's arithmetic/logical functional units evaluate the conditional expressions and then the processor performs the branch operation, according to the specified branching function.

20 Claims, 7 Drawing Sheets

| | |
|---|---|
| 000000 | 100.010.011.000.010.001.000.110.111.000.110.101.100.001.011.010 |
| 000001 | 101.000.010.110.111.001.111.010.000.111.101.001.001.000.101.001 |
| 000010 | 000.001.010.101.100.101.001.010.100.111.000.010.001.000.101.001 |
| 000011 | 110.010.011.111.010.001.000.110.111.000.110.101.110.001.011.010 |
| 000100 | 101.000.010.110.111.001.101.010.000.111.101.001.001.000.101.111 |
| 000101 | 111.001.010.101.100.101.001.010.100.111.000.010.001.000.101.001 |
| 000110 | 101.010.011.000.010.011.000.110.111.000.110.101.110.001.011.010 |
| 000111 | 101.000.010.110.111.001.101.010.000.111.101.001.001.000.111.001 |
| 001000 | 000.001.010.101.100.101.001.010.100.111.000.010.001.000.101.001 |
| 001001 | 011.011.011.000.001.001.000.010.010.010.000.001.001.001.000 |
| 001010 | 101.000.010.110.111.001.101.010.000.111.101.111.001.000.101.001 |
| 001011 | 101.001.010.101.100.101.001.010.100.111.000.010.001.000.101.111 |
| 001100 | 100.010.111.000.010.001.000.110.111.010.110.101.100.001.011.010 |
| 001101 | 101.000.010.110.111.001.101.010.000.111.101.001.001.111.101.001 |
| 001110 | 000.001.010.101.100.101.001.010.100.111.000.010.001.000.111.001 |
| 001111 | 100.010.011.000.010.001.000.110.111.000.110.101.100.001.011.010 |
| 010000 | 101.000.010.110.111.001.101.010.111.111.101.001.001.000.101.001 |
| 010001 | 000.001.010.101.100.101.001.010.100.111.000.010.001.111.101.001 |
| 010010 | 100.010.011.111.010.001.000.110.111.000.110.101.100.001.011.010 |
| 010011 | 101.000.010.110.111.001.101.111.000.111.101.001.001.000.101.001 |
| 010100 | 000.001.010.101.100.101.001.010.100.111.000.010.111.000.101.001 |
| 010101 | 100.010.011.000.010.001.111.110.111.000.110.101.100.001.011.010 |
| 010110 | 101.000.111.110.111.001.101.010.000.111.101.001.001.000.101.001 |
| 010111 | 000.001.010.101.100.101.001.010.100.111.111.101.001.000.101.001 |
| 011000 | 111.010.011.000.010.001.000.110.111.000.110.101.100.001.011.010 |
| 011001 | 101.000.010.110.111.001.101.010.000.111.101.001.001.000.101.001 |
| 011010 | 000.001.110.101.100.101.111.010.100.111.000.010.001.000.101.001 |
| 011011 | 100.010.011.111.110.001.000.110.111.000.110.101.111.001.011.010 |
| 011100 | 101.111.010.110.111.001.101.010.000.111.101.001.001.000.101.001 |
| 011101 | 000.001.111.101.100.101.001.010.100.111.000.010.001.000.101.001 |
| 011110 | 100.010.011.000.010.001.000.110.111.111.110.101.111.001.011.010 |
| 011111 | 101.000.010.110.111.001.101.010.000.111.101.001.001.000.101.001 |
| 100000 | 000.001.010.101.111.101.001.010.100.111.000.010.001.000.101.001 |
| 100001 | 100.010.011.111.010.001.000.110.111.111.110.101.100.001.011.010 |
| 100010 | 111.000.010.110.111.001.101.010.000.111.101.001.001.000.101.001 |
| 100011 | 000.001.010.101.100.101.001.010.100.111.000.010.001.000.101.001 |
| 100100 | 100.010.011.000.010.001.000.110.111.000.110.101.100.001.011.010 |
| 100101 | 000.111.010.101.100.101.001.010.100.111.000.010.001.000.101.001 |
| 111111 | 100.010.011.000.010.001.000.110.111.000.110.101.100.001.011.010 |

*FIG. 6*

BRANCHING TO TARGET ADDRESS BY ADDING VALUE SELECTED FROM PROGRAMMABLE OFFSET TABLE TO BASE ADDRESS SPECIFIED IN BRANCH INSTRUCTION

CROSS-REFERENCE TO RELATED APPLICATIONS

This application is a continuation of U.S. application Ser. No. 12/342,851, filed Dec. 23, 2008, the entire disclosure of which is incorporated herein by reference.

TECHNICAL FIELD

The present invention generally relates to branching during processor execution, and relates more particularly to a programmable branch table used for atomically evaluating multiple conditional expressions and jumping to one of several possible target instructions.

BACKGROUND ART

Programs consist of blocks or strings of sequential instructions, which have a single entry point (the first instruction) and a single exit point (the last instruction). There can be a choice from a number of instruction blocks to be executed after any particular block. When there is more than one possible block, one or more conditions must be used to determine which block to choose. The pattern of links between blocks is called the program's control or flow graph.

These blocks of instructions are packed together in memory. When there is no choice of subsequent block (block B), it can normally be placed immediately after the first block (block A). This means that there need not be any explicit change in control to get from block A to block B. Some blocks have a choice of successor blocks. Clearly only one of the successors, for example block B, can be placed sequentially afterwards. The other block, block C, is indicated explicitly within block A. A conditional mechanism is used to determine which block is to be chosen. If the condition is met, then the chosen successor block is block C. If the condition is not met, then the chosen successor is block B. These are conditional branches.

Branches are well known in the art and are essential for a computer system to execute any program. Known computer systems typically contain a special register, the program counter register, which provides an indication of the address of the next instruction to execute. This register is usually automatically incremented after an instruction executes, so that it now indicates the address of the next sequential instruction. Branch instructions are used to change this behavior. These branch instructions specify an alternative address (the target location) for the next executable instruction. Conditional branch instructions also specify a condition which must be met for the alternative address to be used, otherwise the program counter is incremented as usual. These branch instructions thus define the end of a block of instructions.

A typical program must perform branching operations in numerous places, called branch points, as it executes. Each branch point has a particular branching function associated with it, which usually differs from the branching functions at most other branch points. A branching function can be defined in terms of a vector of M conditional expressions and a set of at most $2^M$ possible target addresses. A processor evaluates these conditional expressions whenever program execution reaches a branch point to which the branching function applies, and thus generates a vector of M boolean values. The branching function maps each of the $2^M$ possible values of this vector to some target address in the program's instruction memory. Programmers wish to write code which executes as few instructions as possible to evaluate the branching function and then perform the branch at each branch point. The twin goals are to minimize the size of the executable code and to maximize execution performance, while maintaining flexibility.

Most general-purpose microprocessors provide a variety of simple two-way conditional branch instructions, in which a branch is taken or not taken depending on whether one particular conditional expression is true or false. If a branch point requires evaluation of more than one conditional expression, and can cause execution to jump to one of more than two possible targets, then a program must execute multiple simple two-way conditional branch instructions. Complex branching patterns, in which a program must evaluate multiple conditional expressions and jump to one of several possible targets from one particular location in the code, occur naturally in a wide variety of computational situations. Programmers typically wish to write code which requires as few instructions as possible and which executes as quickly as possible when performing such complex branch decisions.

SUMMARY OF INVENTION

Systems and methods consistent with the present invention provide branch processing that is more efficient and flexible than prior branch processing schemes. In accordance with systems and methods consistent with the present invention, a processor allows one instruction to specify the evaluation of an arbitrary number of different conditional expressions and then jump to one of multiple possible targets, according to some arbitrary branching function which was previously stored in a programmable branch table. By compressing such a complex branch computation into one instruction, the size of the executable code is reduced (as measured by the number of instructions stored in memory) and performance is increased (as measured by the number of instructions dynamically fetched and executed). This technique also offers the benefit of flexibility, by allowing software to define many different branching functions and place them in the branch table.

In one embodiment, a method is performed in a processor of a data processing system including the processor and a program counter, the method comprising the steps of executing a computer program including a plurality of microcode instructions, wherein one of the plurality of microcode instructions is a branch instruction having a plurality of conditions; evaluating the branch instruction; jumping to a next instruction based on a result of the plurality of evaluated conditions of the branch instruction; and executing the next instruction.

In a second embodiment, a computer-readable medium stores computer executable instructions for performing a method of evaluating multiple-condition branch instructions, the method comprising the steps of executing a computer program including a plurality of microcode instructions; evaluating a branch instruction including a plurality of conditions; jumping to a next instruction based on a result of the plurality of evaluated conditions; and executing the next instruction.

In a third embodiment, a data processing device for executing a program including at least one branch instruction comprises a memory storing the program, wherein the at least one branch instruction includes a field containing a branch code;

and a branch table data structure that maps at least one branch code to at least one branch function having at least two conditional expressions, wherein possible outcomes of the branching function based on the two or more conditional expressions are stored in the branch table data structure; and a processor that executes the program and that uses the branch table data structure to execute the at least one branch instruction.

Other systems, methods, features, and advantages consistent with the present invention will become apparent to one with skill in the art upon examination of the following figures and detailed description. It is intended that such additional systems, methods, features, and advantages be included within this description and be within the scope of the invention.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

FIG. 6 illustrates an example of a branch table according to one embodiment.

DESCRIPTION OF EMBODIMENTS

Methods and systems consistent with the present invention provide flexible and efficient branching during execution of a program. By providing a processor with a branch table, the processor can atomically evaluate branching functions where there are more than two possible outcomes. A branching function maps an M-bit vector of condition codes to an N-bit value which indicates one of $2^N$ possible branch targets. There are many ($2^{N*2^M}$) possible functions that map each M-bit vector value to an N-bit branch target value. Thus, multiple conditions may be evaluated within a single instruction, and any one of the several targets may be selected based on the results of those conditions. Accordingly, conventional stored program code and microcode may execute more efficiently than in prior processing environments. Furthermore, the branch table is defined at compile-time, providing the programmer with increased flexibility in handling branching instructions.

Reference will now be made in detail to an implementation consistent with the present invention as illustrated in the accompanying drawings.

One area where processors encounter situations that would benefit from multiple conditional branch instructions is packet processing in a network device. Network devices such as router 103 typically have a lookup unit (LU) 101, described below, to process packet headers and determine the destination, or next hop, of each packet. In some embodiments, instead of an LU, one or more other components perform this function. Although the embodiments below are described in terms of a router 103, the router 103 is given by example and illustration only, and other types of processing apparatus and systems can employ multiple conditional branch instructions as disclosed herein.

Figure 1:
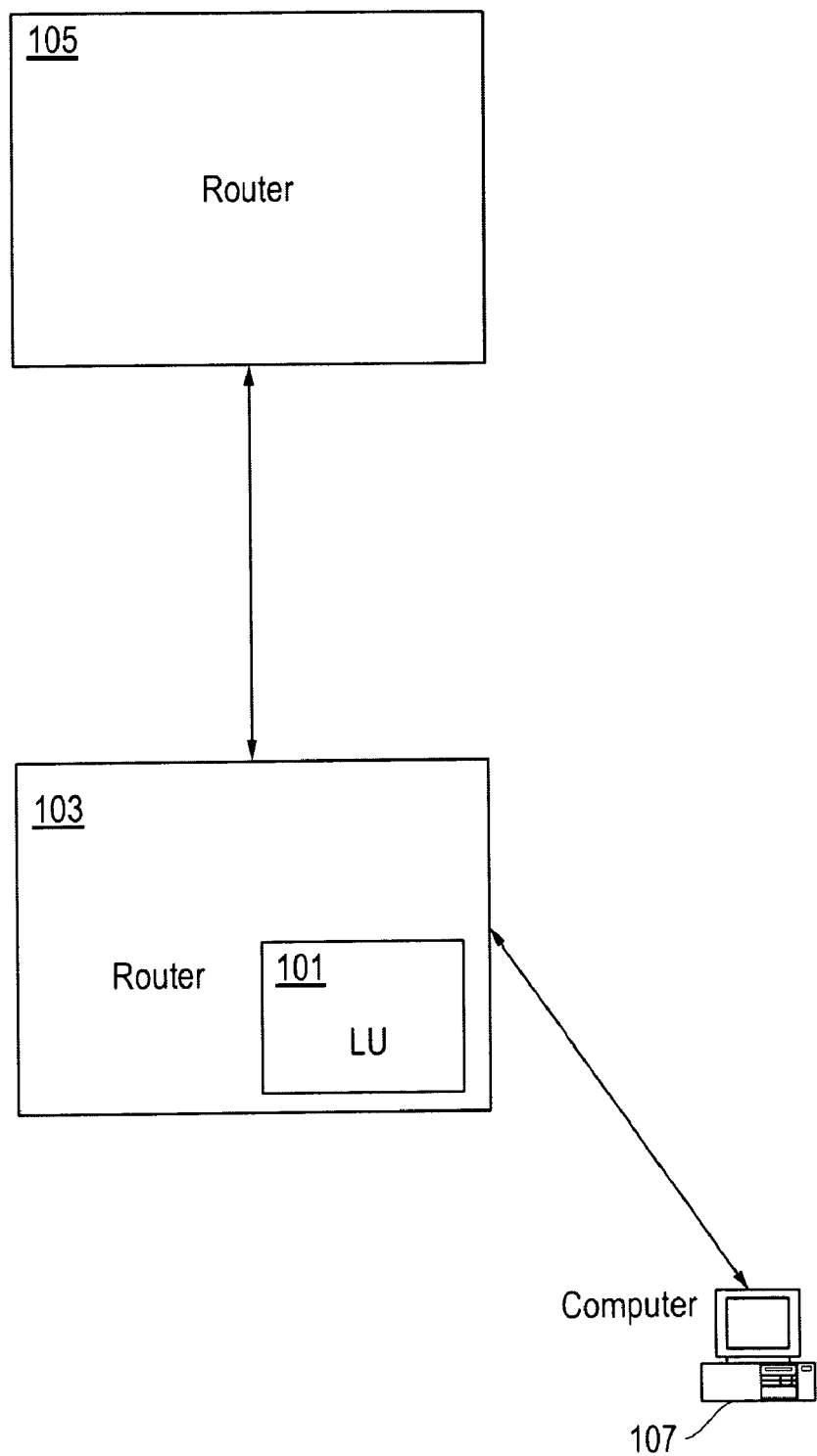
FIG. 1 is a block diagram illustrating an exemplary network environment according to one embodiment.

FIG. 1 illustrates an exemplary network according to one embodiment. Router 103 receives packets from other network devices, such as router 105. The LU 101 processes the packets and determines the next hop for each packet. Once the next hop is determined, each packet is forwarded to that device, for example, computer 107. In making this determination, packet processing engines (PPEs) or other router components (not shown in FIG. 1) execute programs that can benefit from multiple conditional branch instructions.

Figure 2:
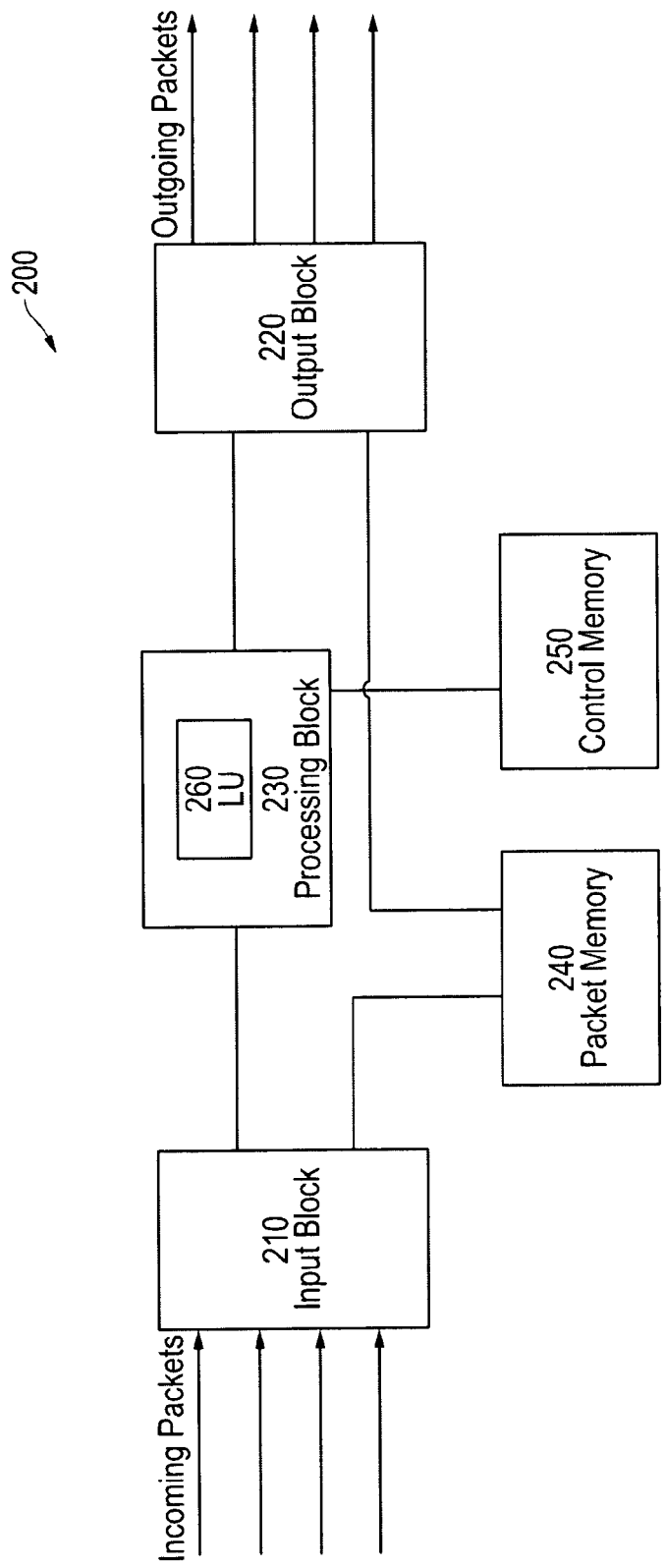
FIG. 2 is a block diagram illustrating an exemplary router according to one embodiment.

FIG. 2 is a block diagram of an exemplary data processing device 200 according to one embodiment. Device 200 may include input block 210, output block 220, processing block 230, packet memory 240, and control memory 250.

Input block 210 may include one or more input units (e.g., input line cards) that may receive packets on ingress links and perform initial processing on the packets. In one embodiment, the initial processing may include analyzing a packet to identify its control information and its packet data (e.g., payload). The control information may include information from the header of the packet, and the packet data may include information from the payload of the packet. In one embodiment, the control information may include a source address and/or a destination address from the header of a packet. In another embodiment, the control information may include a source address, a destination address, priority information, and/or other information from the header of the packet. Output block 220 may include one or more output units (e.g., output line cards) that may receive packet information from processing block 230 and/or packet memory 240, construct packets from the packet information, and output the packets on egress links.

Processing block 230 may include processing logic that may perform routing functions and handle packet transfers between input block 210 and output block 220. Processing block 230 may receive the control information from input block 210 and process the control information based on data structures stored in control memory 250. When processing the control information, processing block 230 may make certain requests to control memory 250 to read and/or write data.

Packet memory 240 may include a memory device, such as a dynamic random access memory (DRAM). Packet memory 240 may store packet data associated with packets received by input block 210. In one implementation, packet memory 240 may store the packet data as a variable length data unit. In another implementation, packet memory 240 may store the packet data as fixed length data units. In this case, the packet data may be divided into one or more of the data units of the fixed length and stored in contiguous or non-contiguous locations in packet memory 240. If stored in non-contiguous locations, data structures, such as linked lists, may be used to identify the data units associated with a particular packet.

Control memory 250 may include a memory device, such as a DRAM or a reduced-latency DRAM (RLDRAM). Control memory 250 may store data structures to assist in the processing of packets. In one implementation, the data structures might include a routing table, a forwarding table, statistics, and/or management data (e.g., quality of service (QoS) parameters).

In one embodiment, processing block 230 includes a lookup unit (LU) 260. In one embodiment, the LU 260 may be implemented as an application-specific integrated circuit (ASIC). The LU 260 contains elements that are responsible for executing instructions that utilize multiple conditional branch instructions as described below.

Figure 3:
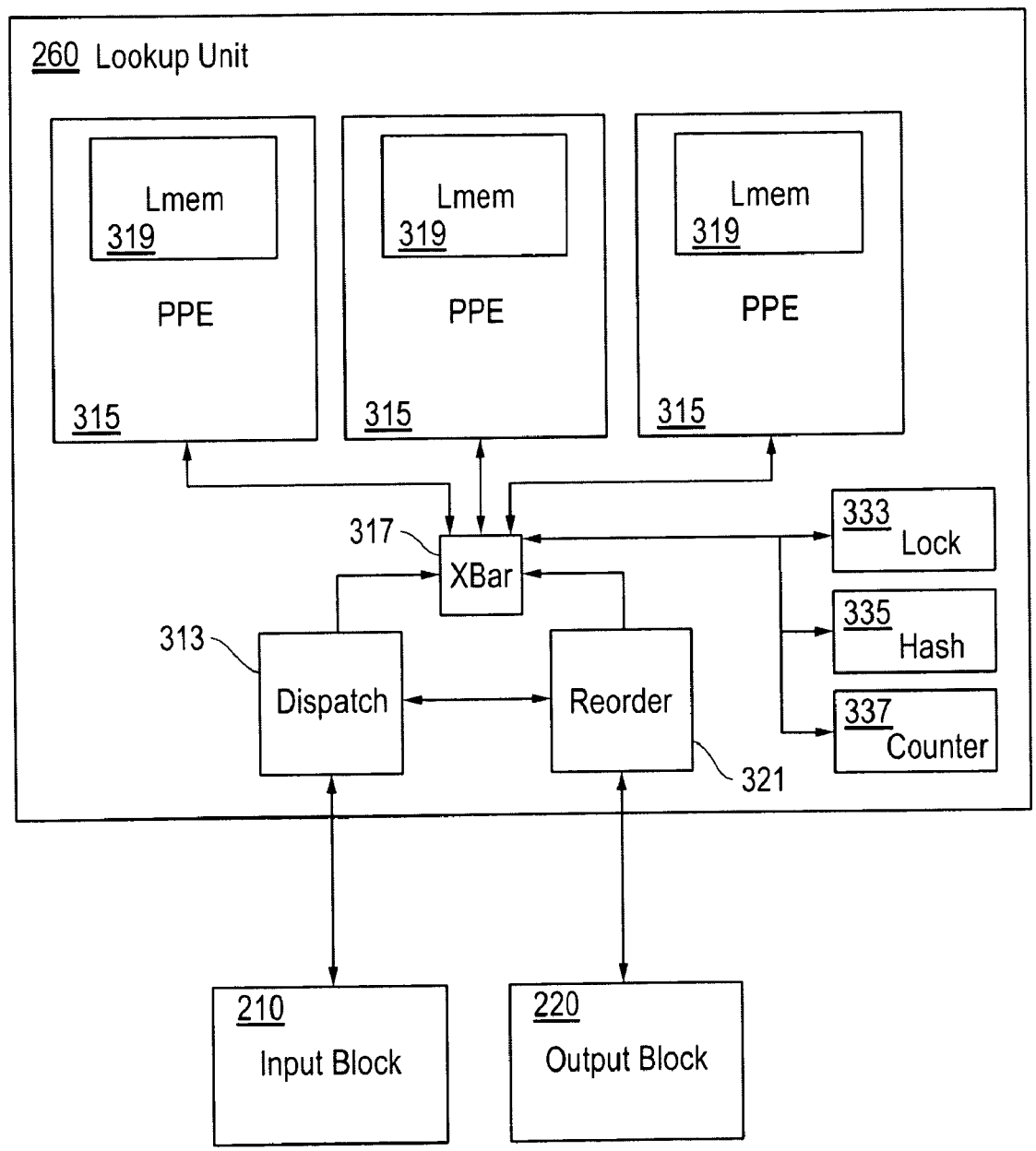
FIG. 3 is a block diagram illustrating a lookup unit according to one embodiment.

FIG. 3 is a high-level simplified block diagram of an LU 260 according to one embodiment. Some features of the LU 260 that are not relevant to the present disclosure have been omitted, and the number, configuration, and arrangement of elements of the LU 260 are not intended to represent the number, configuration, or physical layout of any embodiment, but have been simplified for clarity of the drawing. For example, in one embodiment, the LU 260 can have 16 PPEs and four crossbar switches, as well as elements that interact with memory units and other units external to the LU 260. Furthermore, although as illustrated in FIG. 3 as a lookup unit, the disclosed techniques can be implemented in a variety of other types of units, and a lookup unit is only exemplary and illustrative of such units.

LU 260 performs functions relating to packet header processing including input processing, route lookup, classification, filtering, policing, accounting, encapsulation, and statistics. The input block 210 sends packet headers to the LU 260 and the LU sends fully-processed new headers to the output block 220. Header processing is done by a collection of identical multi-threaded Packet Processing Engines (PPEs) 315, described below. Each of the PPEs 315 is identified with a PPE number. Headers come into the LU 260 via a Dispatch Block 313 and are sent to the PPEs 315 through crossbar block 317. The Dispatch Block 313 picks the least heavily loaded engine for each header. Once a PPE 315 is assigned, the header is moved to that PPE and stays within that PPE until processing on the header is completed. Each PPE 315 has its own local memory (LMem) 319 to hold the packet header and other state needed during processing. Each PPE 315 supports multi-way branching as described below. The number of PPEs in FIG. 3 is exemplary and illustrative only, and other numbers of PPEs can be used as desired to provide sufficient processing power to service the highest traffic volumes that the LU 260 is required to handle.

In some embodiments, data structures used by the PPEs 315 are kept in a single large flat address space called DMem (external to the LU 260 and not shown in FIG. 3) that is shared by the PPEs. DMem accesses between separate threads (executing in different PPEs 315, or different contexts within the same PPE 315) are not synchronized; instead, a separate Lock block 333 is provided as a mechanism for synchronizing threads. Multiple threads may share common data structures by acquiring a lock from Lock block 333, working on the data structures, and releasing the lock. A PPE 315 may also interact with several other blocks that implement special functions such as Counter block 337 for updating packet and byte counters, and Hash block 335 for obtaining a hash value.

When a PPE 315 has finished processing a header, it notifies a Reorder Block 321. The Reorder Block 321 is responsible for maintaining order for headers belonging to the same flow, and pulls a header from a PPE 315 when that header is at the front of the queue for its reorder flow.

Figure 4:
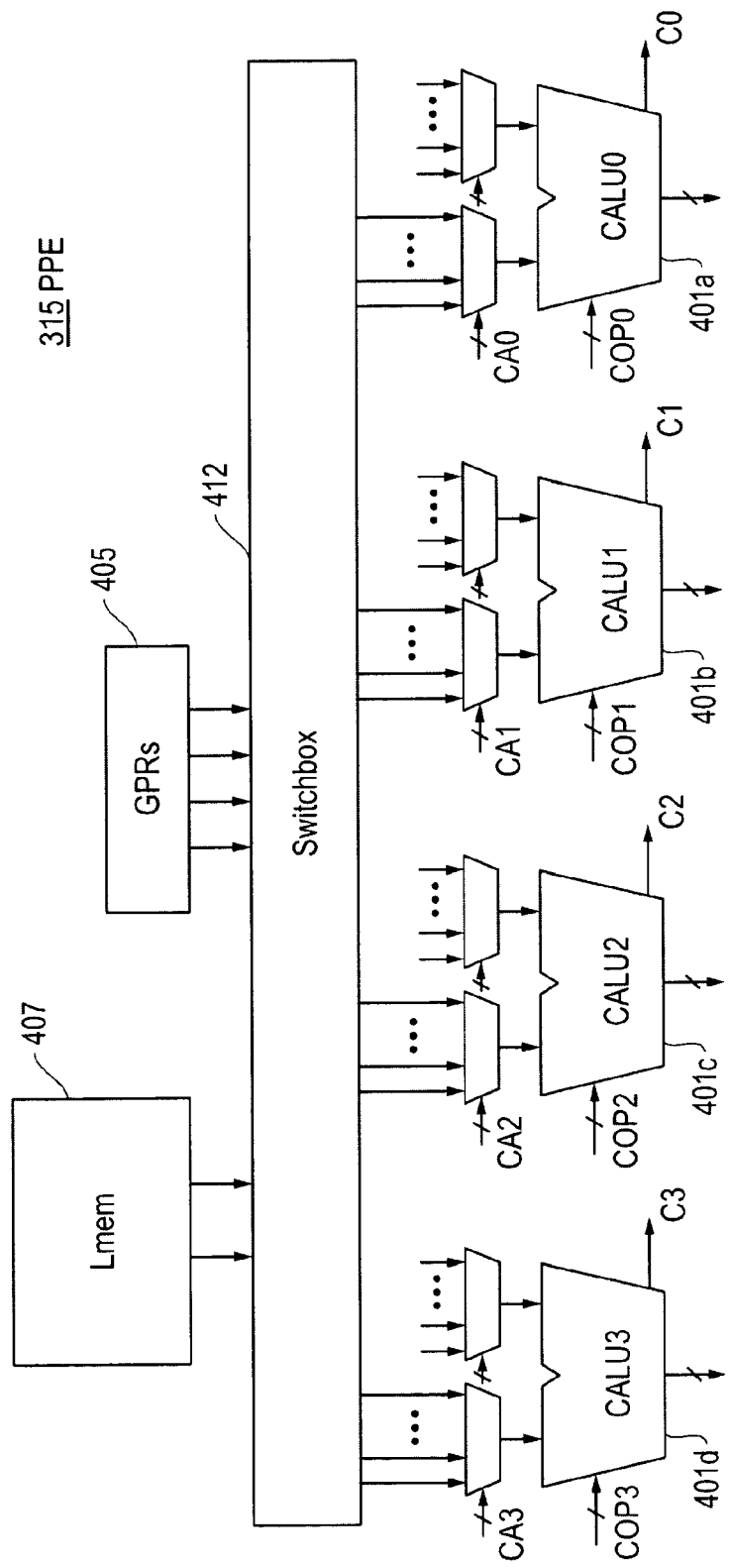
FIG. 4 is a block diagram illustrating a packet processing engine according to one embodiment.

FIG. 4 illustrates a simplified architecture of an exemplary PPE 315 according to one embodiment. Certain elements of the PPE 315 are omitted or rearranged for clarity of the drawing. The PPE 315 uses a Very Long Instruction Word (VLIW) architecture with four 32-bit Arithmetic Logic Units (ALUs) (CALUs 401a-d) (collectively, CALUs 401) used for conditional branching and operand conditioning. Other ALUs not relevant to the present application may be present and are omitted for clarity of the drawing. Each thread in the PPE 315 has access to 32 64-bit general purpose registers (GPRs) 405, and 8 KB of local memory LMem 407 (1K private per thread). A typical microinstruction allows 4 GPR reads, 2 GPR writes, 2 LMem accesses (read or write) and two 64-bit constants. A total of 6 arbitrary bit fields may be extracted and fed to each of the CALUs 401. A switchbox 412 is used to connect the various elements of the PPE 315 in one embodiment. Other embodiments may use other interconnection techniques, such as one or more busses. The above internal architecture for the PPE 315 is exemplary and illustrative only, and other internal architectures, including other numbers, configurations, and arrangements of elements, can be used as desired.

Figure 5:
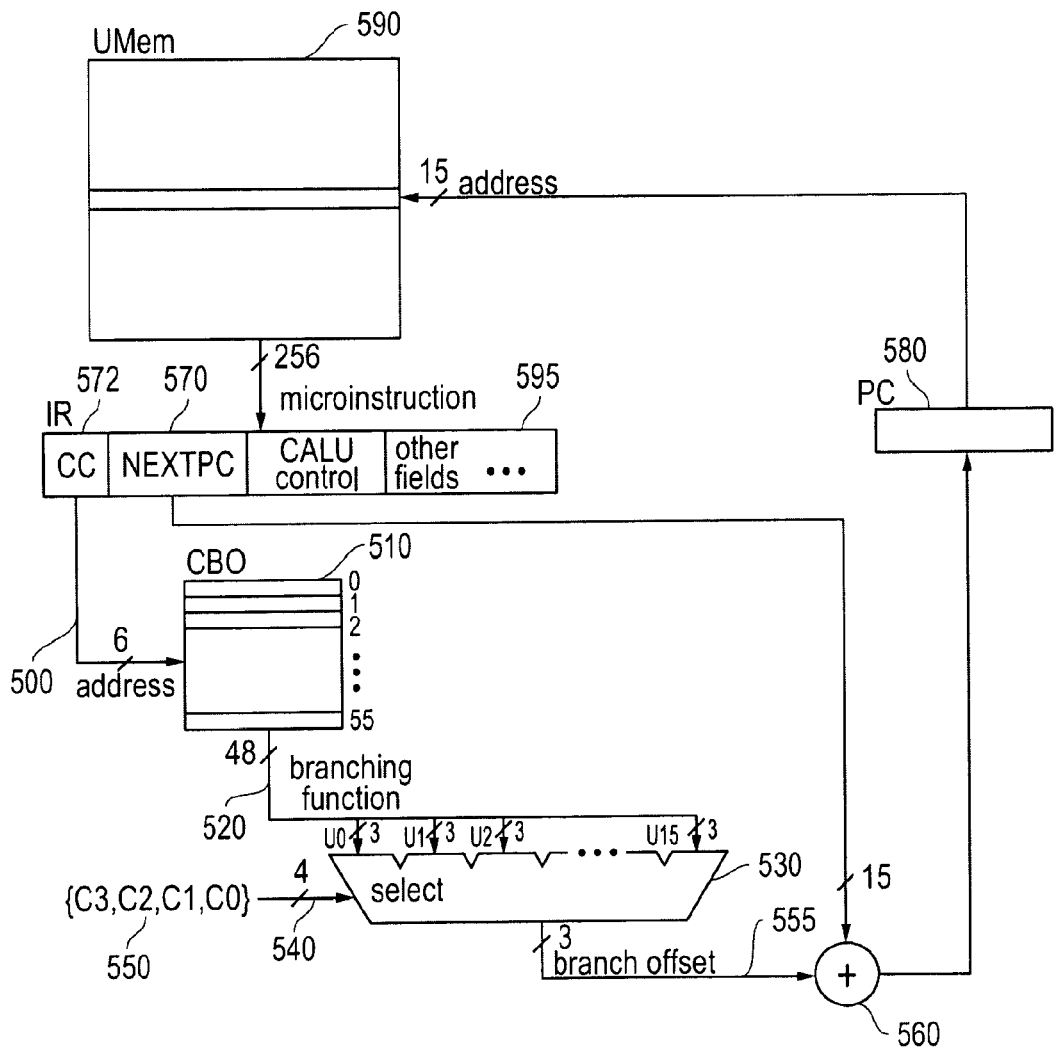
FIG. 5 is a logic diagram illustrating a technique for address computation according to one embodiment.

Turning to FIG. 5, a diagram illustrating a technique for address computation is depicted in accordance with one embodiment of the present disclosure. In this embodiment, the address of the next instruction executed by the PPE 315 in FIG. 4 does not depend on the address of the current instruction, but on the computations indicated by the CC 572 and NEXTPC 570 fields of the current instruction. Most of the encodings for the 6-bit CC field 572 indicate that the PPE 315 should perform a branch according to a particular branching function in the PPE's 315 conditional branch outcome (CBO) table 510. The particular value of the CC field 572 serves as an index to indicate a particular entry in the CBO table 510. A small number of encodings for the CC field 572 indicate special hard-wired methods for computing the address of the next instruction. However, these hard-wired methods do not involve the CBO table 510.

The size of each entry in the CBO table 510 is $N*2^M$ bits. The PPE 315 interprets each entry's value as a vector of $2^M$ elements, with each element having a size of N bits. When the PPE 315 executes an instruction whose CC field refers to a CBO table entry, the PPE 315 uses the condition code bits computed by the M CALUs to select one of the elements from the vector represented by the CBO table entry. The PPE 315 then adds the N-bit value of the selected element to the NEXTPC 570 value of the current instruction to determine the address of the next instruction to fetch and execute. In the example as illustrated in FIG. 5, the value of M is 4 and the value of N is 3. Therefore, the size of each entry in CBO table in this example is $3*2^4$, which is equal to 3*16 or 48 bits.

In operation, a microinstruction 595 obtained from a microcode memory (UMem) 590 contains a 6-bit CC field 572, which is sent over 6-bit combiner code (CC) signal line 500 to address a CBO branch table memory unit 510, indexing and selecting one of 56 48-bit CBO 510 table entries corresponding to the 6-bit CC value. That 48-bit CBO table 510 entry is then output on a 48-bit signal line 520 to a multiplexer 530, dividing the 48-bit table entry on the 16 3-bit element lines u0 through u15. Each of the CALUs 401 generates a 1-bit condition code value, determined by the CALU 401 operation encoded in the microinstruction 595 and the data operands input into the CALU 401. Denote those four condition code bits as C0, C1, C2, and C3. A 4-bit signal 550, combines the values of condition codes C3, C2, C1, and C0, and is sent on signal line 540 to select one of the sixteen 3-bit elements of the selected 48-bit table entry by multiplexer 530 onto a 3-bit outcome line 555. The 3-bit element value is then added by adder 560 to the 15-bit value of the NEXTPC field 570 of the microinstruction 595, resulting in a 15-bit address value that is then passed on to the program counter 580 as the location of the next instruction or microinstruction in the UMem 590 for the PPE 315 to execute. The bit widths and arrangements of the elements, memory units, table entries, signal lines, fields, etc. of FIG. 5, as well as the number of condition codes are exemplary and illustrative only, and any sized elements, memory units, table entries, signal lines, and registers can be used as desired.

FIG. 6 illustrates an exemplary branch table 510 used for evaluating branch functions. A branch instruction is encoded in a 6-bit microinstruction field called a combiner code (CC) 601. This provides 64 possible sequencing actions. Most of the CCs are used as an index to entries in branch table 510 defining sequencing actions for conditional branching with 8 or less outcomes. The branch table 510 does not have to have an entry for every possible CC. In one embodiment, a 56-element branch table is used. Each branch entry, called a conditional branch outcome (CBO) entry 605, comprises the CC 601 and a corresponding branching function mapping 4 condition code bits C0 through C3 to a 3-bit outcome code or element. Thus, each branching function within a CBO entry 605 in branch table 510 is described as a 48-bit entry divided into 16 3-bit elements. The 4 condition code bits C0 through C3 are used to form a 4-bit index {C3, C2, C1, C0}, which is mapped into the CBO table entry 605 to select the 3-bit element. The sequencing action taken by the PPE is to add the element value to NEXTPC.

For example, let us assume we want to allocate CC 001001 to represent the conditional branch:

if ($c0$ & $c1$)<$A0$>elseif($c2$)<$A1$>elseif($c3$)
    <$A2$>else<$A3$> where A0, A1, A2, A3 represent the offsets of four possible conditional outcomes. Offsets A0, A1, A2, and A3 must be in sequential order starting at 0 and in further consecutive order to generate an address of the next instruction. A CBO table entry mapping the condition code bits to the desired offset is illustrated in Table 1 below:

TABLE 1

Example CBO Table Entry at Index 001001 (binary)

|       | c1, c0 |     |     |     |
|-------|--------|-----|-----|-----|
|       | 0      | 0   | 1   | 1   |
| c3, c2 | 0     | 1   | 0   | 1   |
| 00    | 3      | 3   | 3   | 0   |
| 01    | 1      | 1   | 1   | 0   |
| 10    | 2      | 2   | 2   | 0   |
| 11    | 1      | 1   | 1   | 0   |

The corresponding 48-bit CBO entry would then be: (3,3, 3,0,1,1,1,0,2,2,2,0,1,1,1,0) as 16 3-bit element values (011.011.011.000.001.001.001.000.010.010.010.000.001. 001.001.000) in binary (the dots separating the 3-bit elements are for readability purposes only and are not present in the CBO entry). Thus, for example, if a branch instruction has a CC=001001 and a NEXTPC=100, and the condition code bit vector is {C3, C2, C1, C0}={0, 0, 1, 0}, the condition code bit vector would map to the third CBO element from the left, which is 011. Thus, the branch outcome would be NEXTPC+3, or 103, and the PPE would jump to the instruction at UMem address 103.

There may be fewer than 4 possible branch targets. For example the branching function:

if($c0$ & $c1$)<$A0$>elseif($c2$|$c3$)<$A1$>else<$A2$> has only three possible branch targets: A0, A1, and A2.

The table mapping the condition code bits to the desired offset is illustrated below:

TABLE 2

Example CBO Table Entry for Three-Way Branch

|       | c1, c0 |     |     |     |
|-------|--------|-----|-----|-----|
|       | 0      | 0   | 1   | 1   |
| c3, c2 | 0     | 1   | 0   | 1   |
| 00    | 2      | 2   | 2   | 0   |
| 01    | 1      | 1   | 1   | 0   |
| 10    | 1      | 1   | 1   | 0   |
| 11    | 1      | 1   | 1   | 0   |

The corresponding 48-bit CBO entry would then be: (2,2, 2,0,1,1,1,0,1,1,1,0,1,1,1,0) as 16 3-bit element values (010.010.010.000.001.001.001.000.001.001.001.000.001. 001.001.000) in binary (the dots separating the 3-bit elements are for readability purposes only and are not present in the CBO entry).

The CBO table allows one of ordinary skill in the art to define any arbitrary collection of 56 different branching functions. Any branching function that maps a 4-bit condition code value to a 3-bit UMem address offset can be coded in the CBO table entry, resulting in as many as eight (8) possible target instructions. In this example, branch table 510 uses 16-element entries. The contents of branch table 510 are defined by the compiler for a given microcode load and are loaded when the router is initialized and before any PPE is started. Alternatively, branch table 510 may be defined dynamically at runtime. In that case, the router may modify the given microcode and the CBO table on the fly. The router can load the microcode into unused locations of the UMem and the corresponding branch functions into unused locations of the CBO table. The router can then overwrite the parcel trap vectors in the HW Trap Vector Table such that the PPE may execute the new microcode and branch functions when new incoming parcels are serviced. One of ordinary skill in the art will recognize that branch table 510 may be a table of any size, and that various entry and element sizes described above may be adjusted accordingly based on acceptable levels of computational and memory resource usage.

Figure 7:
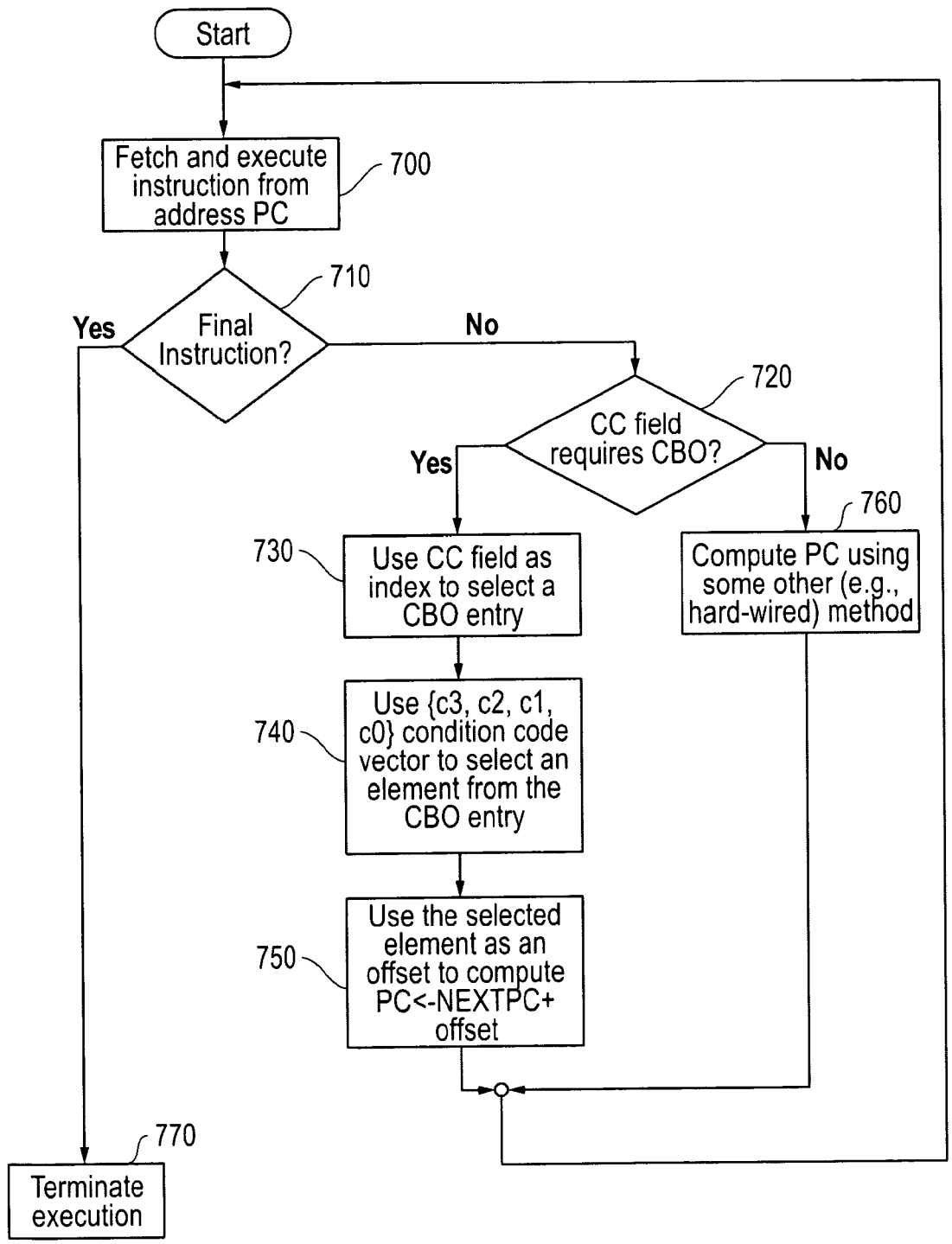
FIG. 7 is a flowchart illustrating a technique for iteratively fetching and executing an arbitrary number of microinstructions according to one embodiment.

FIG. 7 is a flowchart illustrating a technique for iteratively fetching and executing an arbitrary number of microinstructions in a PPE 315. In block 700, a first instruction is fetched and executed from the address contained in the program counter PC. In block 710, that instruction is checked to see if it is a final instruction. If Yes, then the PPE 315 terminates execution in block 770. If No, then the CC field of the microinstruction is checked in block 720 to determine whether the CBO table is used. If no, in block 760, the program counter PC is updated by some non-CBO technique, such as a hard-wired branching function.

If block 720 determines that the CBO table is to be used, in block 730 the CC field is used as an index to select an entry from the CBO table. Then in block 740, the condition code vector {c3, c2, c1, c0} is used to select an element from the CBO table entry, as described above. The selected element is then used as an offset to update the program counter PC in block 750 by adding the value of the NEXTPC field of the current microinstruction to the offset value contained in the element selected by the condition code vector.

When the program counter PC is updated by either block 760 or block 750, the PPE 315 then returns to block 700 to iteratively fetch and execute the instruction pointed to by the program counter PC.

The operations and ordering of operations shown in FIG. 7 are exemplary and illustrative only and other operations and ordering of operations can be used to compute the address of the next instruction according to other embodiments as desired.

While certain exemplary embodiments have been described in details and shown in the accompanying drawings, it is to be understood that such embodiments are merely illustrative of and not devised without departing from the basic scope thereof, which is determined by the claims that follow. By way of example and not limitation, the specific logic components utilized may be replaced by known equivalents or other arrangements of components which function similarly and provide substantially the same result.

What is claimed is:

1. A method comprising:
   executing, by a device, a first instruction that includes a field that identifies information related to a branch instruction;
   identifying, by the device and based on a value of the field, an entry in a memory that stores a plurality of entries,
   the identified entry identifying a branching function,
   the identified entry including a plurality of elements relating to the branching function;
   selecting, by the device, a particular element, of the plurality of elements, based on information identifying a condition associated with the branching function that is associated with the identified entry;
   determining, by the device and based on the particular element, a second instruction that is to be executed after the first instruction,
   determining the second instruction including:
      adding a value of the particular element to a value of another field, included in the first instruction, to obtain an address of the second instruction;
      obtaining, by the device, the second instruction based on the address of the second instruction; and
      executing, by the device, the second instruction.

2. The method of claim 1, where identifying the entry includes:
   using the value of the field as an index to identify the entry in the memory, and
   where the plurality of entries identifies a plurality of branching functions including the branching function.

3. The method of claim 1, where adding the value of the particular element to the value of the other field includes using the value of the particular element as an offset to obtain the address of the second instruction.

4. The method of claim 1, further comprising:
   defining the plurality of entries at runtime.

5. The method of claim 1, further comprising:
   defining, by a compiler associated with the device, the plurality of entries prior to a router, associated with the device, being initialized.

6. The method of claim 1, where adding the value of the particular element to the value of the other field includes:
   updating, based on the particular element, a program counter that is associated with execution of a plurality of instructions that includes the first instruction and the second instruction.

7. The method of claim 1, where the first instruction and the second instruction correspond to microinstructions of a program.

8. A device comprising:
   a processor to:
      execute a first instruction of a plurality of instructions; and
      determine an address of a second instruction, of the plurality of instructions, to execute after executing the first instruction,
      when determining the address of the second instruction, the processor is to:
         identify an entry in a memory based on information, included in the first instruction, that relates to a branch instruction,
         the memory storing a plurality of entries,
         the identified entry identifying a branching function, and
         the identified entry including a plurality of elements;
         select a particular element, of the plurality of elements, based on information identifying a condition associated with the branching function; and
         add a value of the particular element to a value of a field, included in the first instruction, to obtain the address of the second instruction.

9. The device of claim 8, where the processor is further to:
   obtain the second instruction based on the address of the second instruction; and
   execute the second instruction.

10. The device of claim 8, where the processor is further to:
    define the plurality of entries by a compiler associated with the device.

11. The device of claim 8, where the processor is further to:
    define the plurality of entries at runtime.

12. The device of claim 8, where the plurality of entries identifies a plurality of branching functions including the branching function.

13. The device of claim 8, where, when adding the value of the particular element to the value of the field, included in the first instruction, the processor is to:
    update a program counter that is associated with execution of the first instruction and the second instruction, where the program counter is updated based on the value of the particular element.

14. The device of claim 8, where the first instruction and the second instruction correspond to microcode instructions of a computer program.

15. A system comprising:
    a device to:
       execute a first instruction that includes information relating to a branch instruction;
       identify, based on the information identifying the branch instruction, an entry in a memory that stores a plurality of entries,
       the identified entry with identifying a branching function,
       the identified entry including a plurality of elements relating to the branching function;
       select a particular element, of the plurality of elements, based on information identifying a condition associated with the branching function; and
       determine an address of a second instruction that is to be executed after the first instruction is executed,
       when determining the address of the second instruction, the device is to:
          add a value, of the particular element, to a value of a field, included in the first instruction, to obtain the address of the second instruction.

16. The system of claim 15, where, when adding the value, associated with the particular element, to the value of the field included in the first instruction, the device is to:
    update a program counter that is associated with execution of the first instruction and the second instruction, where the program counter is updated based on the value of the particular element.

17. The system of claim 15, where the first instruction and the second instruction correspond to microcode instructions of a program.

18. The system of claim 15, where the device is further to:
define the plurality of entries at compiler time.

19. The system of claim 15, where the device is to:
obtain the second instruction based on the address of the second instruction; and
execute the second instruction.

20. The system of claim 15, where the device is further to:
define the plurality of entries at runtime.

* * * * *

UNITED STATES PATENT AND TRADEMARK OFFICE
CERTIFICATE OF CORRECTION

| | | |
|---|---|---|
| PATENT NO. | : 8,332,622 B2 | |
| APPLICATION NO. | : 13/323358 | |
| DATED | : December 11, 2012 | |
| INVENTOR(S) | : Anurag P. Gupta et al. | |

It is certified that error appears in the above-identified patent and that said Letters Patent is hereby corrected as shown below:

Claim 15, line 8 (Column 10, line 47), delete "with".

Signed and Sealed this
Twenty-ninth Day of January, 2013

David J. Kappos
*Director of the United States Patent and Trademark Office*